United States Patent
Uchida

(10) Patent No.: US 12,516,711 B2
(45) Date of Patent: Jan. 6, 2026

(54) RELEASE DEVICE FOR NON-EXCITATION TYPE ELECTROMAGNETIC BRAKE

(71) Applicant: Honda Motor Co., Ltd., Tokyo (JP)

(72) Inventor: Shintaro Uchida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 18/177,118

(22) Filed: Mar. 2, 2023

(65) Prior Publication Data

US 2023/0304552 A1 Sep. 28, 2023

(30) Foreign Application Priority Data

Mar. 23, 2022 (JP) ................................. 2022-047198

(51) Int. Cl.
*F16D 65/18* (2006.01)
*B60T 17/22* (2006.01)
*F16D 65/28* (2006.01)
*F16D 121/22* (2012.01)

(52) U.S. Cl.
CPC ............ *F16D 65/28* (2013.01); *B60T 17/221* (2013.01); *F16D 2121/22* (2013.01)

(58) Field of Classification Search
CPC ..... F16D 65/28; F16D 2121/22; B60T 17/221
USPC ................................................ 188/156–162
See application file for complete search history.

(56) References Cited

U.S. PATENT DOCUMENTS

| 12,222,013 | B2* | 2/2025 | Xu ............................. H02P 3/02 |
| 2012/0268856 | A1 | 10/2012 | Maruno et al. |
| 2016/0178020 | A1* | 6/2016 | Masuda ................ F16D 55/225 |
| | | | 188/162 |
| 2021/0257942 | A1* | 8/2021 | Sakai ........................ H02P 3/22 |

FOREIGN PATENT DOCUMENTS

| JP | S56040180 | 4/1981 |
| JP | S6158900 | 4/1986 |
| JP | H0515200 | 1/1993 |
| JP | H10248282 | 9/1998 |
| JP | 2011075056 | 4/2011 |
| JP | 2018113738 | 7/2018 |

OTHER PUBLICATIONS

"Office Action of Japan Counterpart Application", issued on Jul. 22, 2025, with English translation thereof, p. 1-p. 8.

* cited by examiner

*Primary Examiner* — Christopher P Schwartz
(74) *Attorney, Agent, or Firm* — JCIPRNET

(57) ABSTRACT

Provided is a release device for a non-excitation type electromagnetic brake that receives power supply from a battery via a brake control device to release a braking state, including: a bypass circuit that connects the battery and the non-excitation type electromagnetic brake without intermediary of the brake control device; a first switch that turns on and off energization to the bypass circuit; and a first step-down circuit provided on the bypass circuit and that reduces a voltage supplied to the non-excitation type electromagnetic brake. The first step-down circuit includes a resistor and a second switch connected in parallel; and a timer circuit that controls on and off of the second switch.

10 Claims, 3 Drawing Sheets

RELEASE DEVICE FOR NON-EXCITATION TYPE ELECTROMAGNETIC BRAKE

CROSS-REFERENCE TO RELATED APPLICATION

This application claims the priority benefits of Japanese application no. 2022-047198, filed on Mar. 23, 2022. The entity of the above-mentioned patent application is hereby incorporated by reference herein and made a part of this specification.

BACKGROUND

Technical Field

The disclosure relates to a release device for non-excitation type electromagnetic brake.

Related Art

A non-excitation type electromagnetic brake that releases braking when receiving power is known. There is a problem with the non-excitation type electromagnetic brake that it is kept in a braking state when a brake control device that supplies power to the non-excitation type electromagnetic brake fails. In response to this problem, Patent Literature 1 (JP 61-58900) discloses a release device that connects a battery and a non-excitation type electromagnetic brake without intermediary of a brake control device.

However, when the battery and the non-excitation type electromagnetic brake are directly connected, there is a problem that excessive power is supplied to the non-excitation type electromagnetic brake, causing the non-excitation type electromagnetic brake to generate heat.

The disclosure suppresses heat generation of a non-excitation type electromagnetic brake in a release device for non-excitation type electromagnetic brake.

SUMMARY

One aspect of the disclosure is a release device (1) for a non-excitation type electromagnetic brake (2) that receives power supply from a battery (23) via a brake control device (24) to release a braking state, including: a bypass circuit (26) that connects the battery and the non-excitation type electromagnetic brake without intermediary of the brake control device; a first switch (27) that turns on and off energization to the bypass circuit; and a first step-down circuit (28) provided on the bypass circuit and that reduces a voltage supplied to the non-excitation type electromagnetic brake.

In the above aspect, the first step-down circuit may include: a resistor (31) and a second switch (32) connected in parallel; and a timer circuit (33) that controls on and off of the second switch.

In the above aspect, the timer circuit may turn off the second switch after a predetermined time has elapsed since the first switch was turned on.

In the above aspect, the bypass circuit may include a second step-down circuit (34) that steps down a voltage of the battery and supplies the voltage to the timer circuit.

In the above aspect, the bypass circuit may be detachably connected to the battery and the non-excitation type electromagnetic brake.

DESCRIPTION OF THE EMBODIMENTS

According to this aspect, the release device for non-excitation type electromagnetic brake can suppress heat generation of the non-excitation type electromagnetic brake. By reducing the voltage supplied to the non-excitation type electromagnetic brake, the release device can suppress the heat generation of the non-excitation type electromagnetic brake.

According to this aspect, when the second switch is turned off, power is supplied to the non-excitation type electromagnetic brake via the resistor. Thereby, the voltage supplied to the non-excitation type electromagnetic brake is reduced, and heat generation of the non-excitation type electromagnetic brake is suppressed.

According to this aspect, the non-excitation type electromagnetic brake can be appropriately changed to the released state. The voltage required to change the non-excitation type electromagnetic brake from the braking state to the released state is higher than the voltage required to keep an excitation electromagnetic brake in the released state from the braking state. Thus, by keeping the second switch on for a predetermined time after the first switch was turned on, a voltage necessary for changing the non-excitation type electromagnetic brake from the braking state to the released state can be supplied to the non-excitation type electromagnetic brake.

According to this aspect, the timer circuit can be operated appropriately.

According to this aspect, it is possible to downsize the non-excitation type electromagnetic brake.

According to the configuration, it is possible to suppress heat generation of a non-excitation type electromagnetic brake in a release device for non-excitation type electromagnetic brake.

Embodiments of a release device for non-excitation type electromagnetic brake according to the disclosure will be described below with reference to the drawings.

Figure 1:
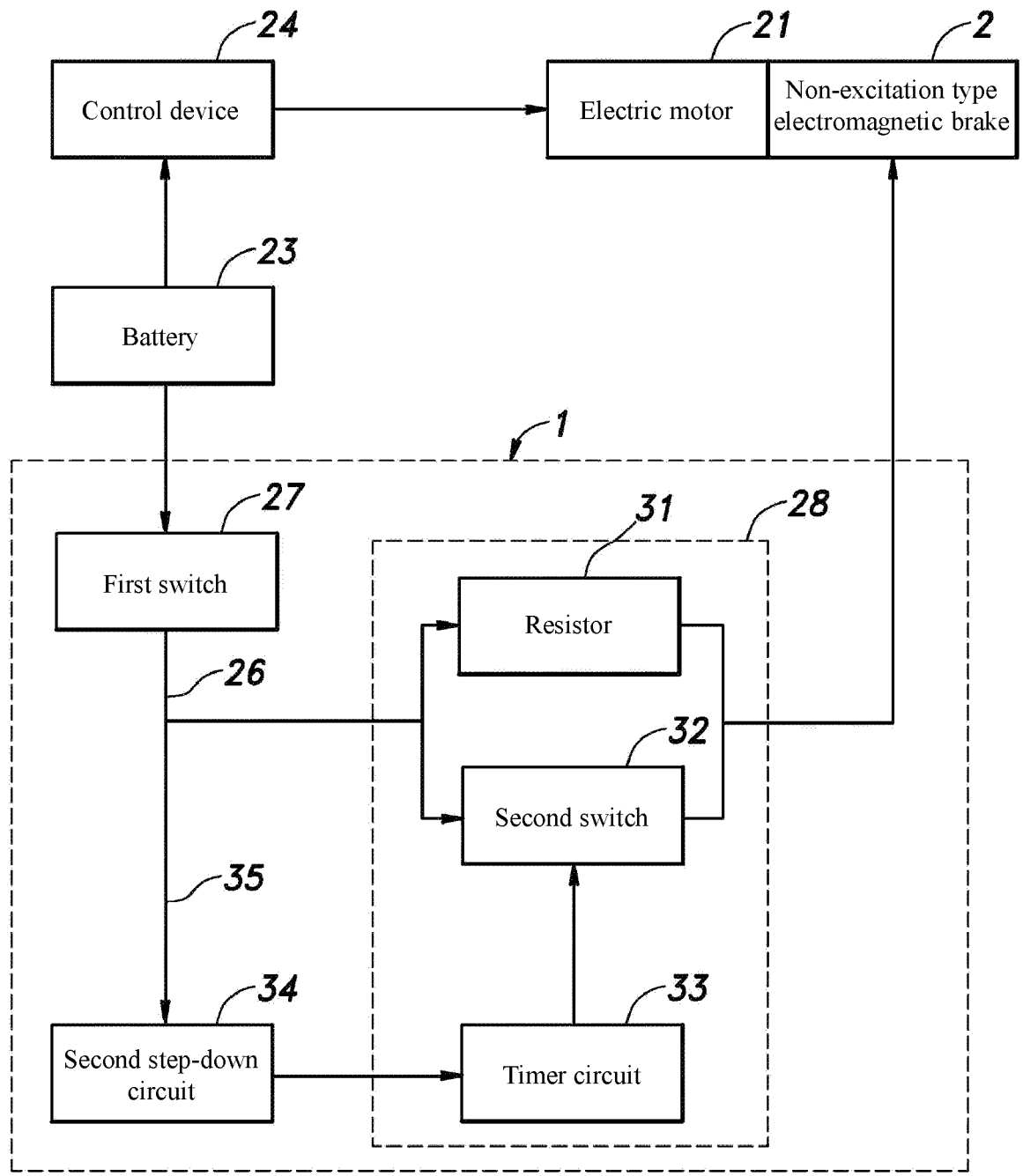
FIG. 1 is a configuration diagram of a release device according to an embodiment.

As shown in FIG. 1, a release device 1 is a device for releasing a braking state of a non-excitation type electromagnetic brake 2. The non-excitation type electromagnetic brake 2 is a brake that generates a braking force at non-energization and eliminates the braking force at energization.

Figure 2:
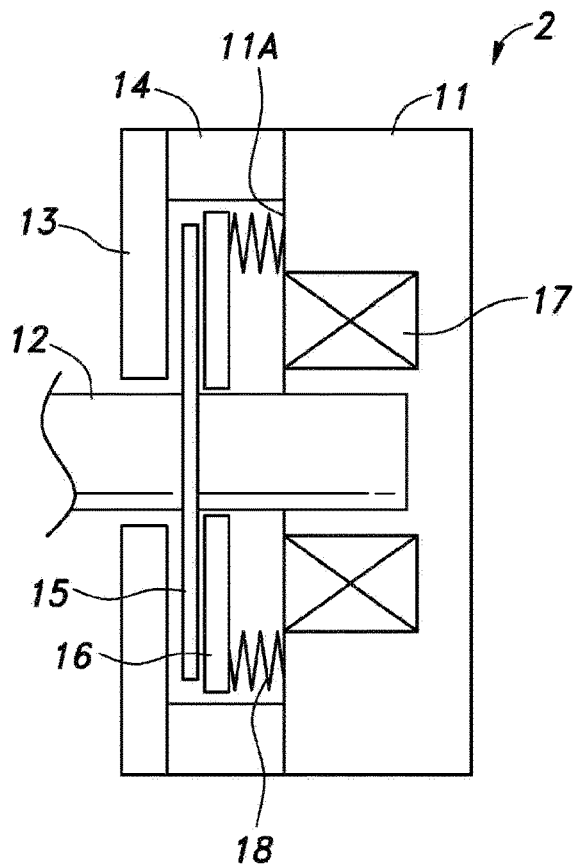
FIG. 2 is an explanatory diagram showing an example of a non-excitation type electromagnetic brake.

The non-excitation type electromagnetic brake 2 includes a yoke 11, a rotor hub 12, a plate 13, a collar 14, a disk 15, an armature 16, a coil 17, and springs 18, as shown in FIG. 2, for example. The rotor hub 12 is rotatably supported by the yoke 11. An end portion of the rotor hub 12 protrudes outward from an end surface 11A of the yoke 11. The collar 14 is provided on an outer peripheral portion of the end surface 11A of the yoke 11. The plate 13 is coupled to the end surface 11A of the yoke 11 via the collar 14. A through hole is formed in a center of the plate 13 for the rotor hub 12 to pass through. The plate 13 faces the end surface 11A of the yoke 11 with a gap therebetween. The disk 15 is coupled to an outer peripheral portion of the end portion of the rotor hub 12. The disk 15 is disposed between the end surface 11A of the yoke 11 and the plate 13. The armature 16 is formed in an annular shape. The armature 16 is disposed at the outer peripheral portion of the end portion of the rotor hub 12, between the end surface 11A of the yoke 11 and the disk 15. The armature 16 is rotatably provided with respect to the rotor hub 12. The spring 18 is provided between the armature 16 and the end surface 11A of the yoke 11 and urges the armature 16 toward the plate 13 side. The coil 17 is provided on the yoke 11.

At non-energization, that is, in a state where power is not supplied to the coil 17, the spring 18 urges the armature 16 toward the plate 13 and the disk 15 comes into contact with the plate 13. Thereby, a frictional force is generated between the disk 15 and the plate 13 and the rotation of the rotor hub 12 with respect to the yoke 11 is regulated. At energization, that is, in a state where power is supplied to the coil 17, the coil 17 attracts the armature 16 toward the yoke 11 and the disk 15 separates from the plate 13. Thereby, the rotor hub 12 is rotatable with respect to the yoke 11.

The rotor hub 12 of the non-excitation type electromagnetic brake 2 is connected to, for example, a rotating shaft of an electric motor 21. Alternatively, the non-excitation type electromagnetic brake 2 may be incorporated in the electric motor 21 and the rotor hub 12 may be integrally formed with the rotating shaft of the electric motor 21.

As shown in FIG. 1, energization to the non-excitation type electromagnetic brake 2 is performed by a battery 23 and a control device 24. The control device 24 is an electric control device including an MPU, memory, and switching elements. The control device 24 controls energization and non-energization from the battery 23 to the non-excitation type electromagnetic brake 2. The control device 24 functions as a brake control device that controls the non-excitation type electromagnetic brake 2. The control device 24 may also control the electric motor 21. In other embodiments, the control device 24 that controls the electric motor 21 may be provided separately.

When the control device 24 fails, power supply to the non-excitation type electromagnetic brake 2 via the control device 24 becomes impossible. The release device 1 supplies power from the battery 23 to the non-excitation type electromagnetic brake 2 without intermediary of the control device 24.

The release device 1 includes a bypass circuit 26 that connects the battery 23 and the non-excitation type electromagnetic brake 2 without intermediary of the control device 24; a first switch 27 that turns on and off energization to the bypass circuit 26; and a first step-down circuit 28 provided on the bypass circuit 26 to reduce voltage supplied to the non-excitation type electromagnetic brake 2. The bypass circuit 26 is connected to the coil 17 of the non-excitation type electromagnetic brake 2.

The first step-down circuit 28 includes a resistor 31 and a second switch 32 connected in parallel, and a timer circuit 33 that controls on and off of the second switch 32. The second switch 32 may be, for example, a transistor such as a bipolar transistor or a field effect transistor.

The first switch 27 is a switch that opens and closes (turns on and off) the bypass circuit 26 by user's operation. The first switch 27 is preferably provided between the battery 23 and the first step-down circuit 28.

The timer circuit 33 turns off the second switch 32 after a predetermined time T1 has elapsed since the first switch 27 was turned on. The bypass circuit 26 includes a second step-down circuit 34 that steps down a voltage of the battery 23 and supplies the voltage to the timer circuit 33. The second step-down circuit 34 supplies a suitable voltage to the timer circuit 33 to properly operate the timer circuit 33.

The bypass circuit 26 includes a branch circuit 35 branched from the first step-down circuit 28 side of the first switch 27. The second step-down circuit 34 and the timer circuit 33 are provided on the branch circuit 35. The second step-down circuit 34 is provided closer to the first switch 27 than the timer circuit 33 is.

The timer circuit 33 outputs a voltage to the second switch 32 for the predetermined time T1 after the voltage is input. The timer circuit 33 may be configured by combining, for example, a NOT circuit and an off-delay circuit. In this case, the timer circuit 33 turns on the second switch 32 when the first switch 27 is turned off, and turns off the second switch 32 after the predetermined time T1 has elapsed since the first switch 27 was turned on. The predetermined time T1 may be adjusted by changing parameters of elements such as capacitors and resistors constituting the timer circuit 33.

The operation of the release device 1 configured as described above will be described. When the control device 24 fails and power supply from the battery 23 to the non-excitation type electromagnetic brake 2 via the control device 24 becomes impossible, the non-excitation type electromagnetic brake 2 is kept in the braking state. The user turns on the first switch 27 when desiring to release the non-excitation type electromagnetic brake 2. Thereby, the power of the battery 23 is supplied to the first step-down circuit 28. By the action of the timer circuit 33, the second switch 32 is turned on for the predetermined time T1 since the first switch 27 was turned on. Therefore, current flows from the battery 23 to the coil 17 of the non-excitation type electromagnetic brake 2 via the second switch 32 instead of the resistor 31. Thereby, the non-excitation type electromagnetic brake 2 is released.

Figure 3:
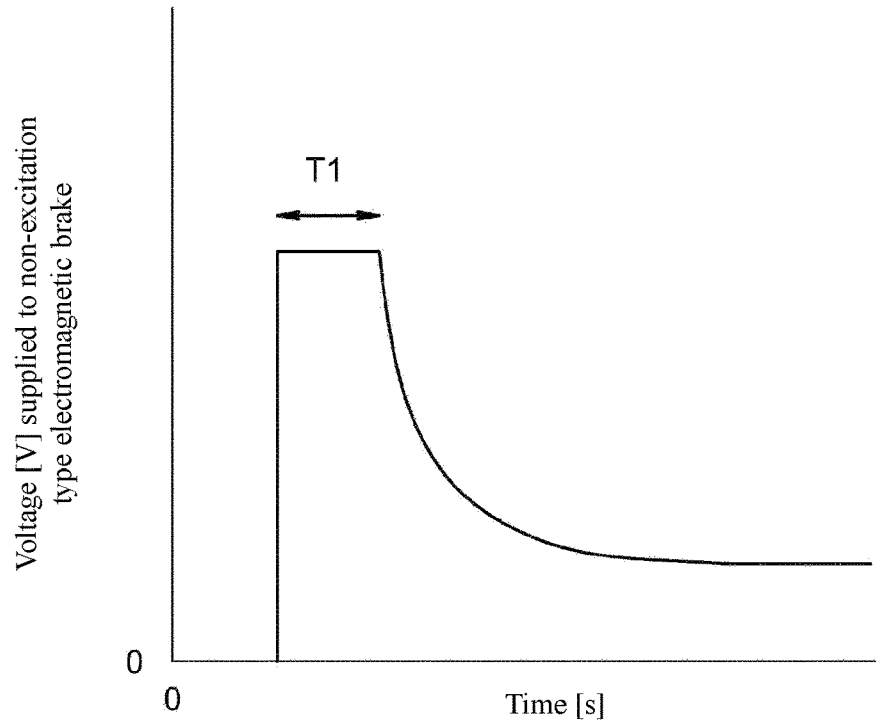
FIG. 3 is a graph showing voltage supplied to a non-excitation type electromagnetic brake via a release device.

After the predetermined time T1 has elapsed since the first switch 27 was turned on, the timer circuit 33 turns off the second switch 32. Thereby, current flows from the battery 23 to the coil 17 of the non-excitation type electromagnetic brake 2 via the resistor 31. As a result, the voltage supplied to the non-excitation type electromagnetic brake 2 is reduced. At this time, the voltage is gradually reduced by inductance of the bypass circuit 26, as shown in FIG. 3. The voltage after being reduced is set to be equal to or higher than a voltage required to keep the non-excitation type electromagnetic brake 2 in the released state. The voltage after being reduced may be adjusted by a resistance value of the resistor 31.

The release device 1 for the non-excitation type electromagnetic brake 2 according to the embodiment can suppress heat generation of the non-excitation type electromagnetic brake 2. The release device 1 can suppress heat generation of the non-excitation type electromagnetic brake 2 by reducing the voltage supplied to the non-excitation type electromagnetic brake 2 after the predetermined time T1 has elapsed since the first switch 27 was turned on.

The voltage required to change the non-excitation type electromagnetic brake 2 from the braking state to the released state is higher than the voltage required to keep an excitation electromagnetic brake in the released state from the braking state. Thus, by keeping the second switch 32 on for a predetermined time after the first switch 27 was turned on, a voltage necessary for changing the non-excitation type electromagnetic brake 2 from the braking state to the released state can be supplied to the non-excitation type electromagnetic brake 2.

Figure 4:
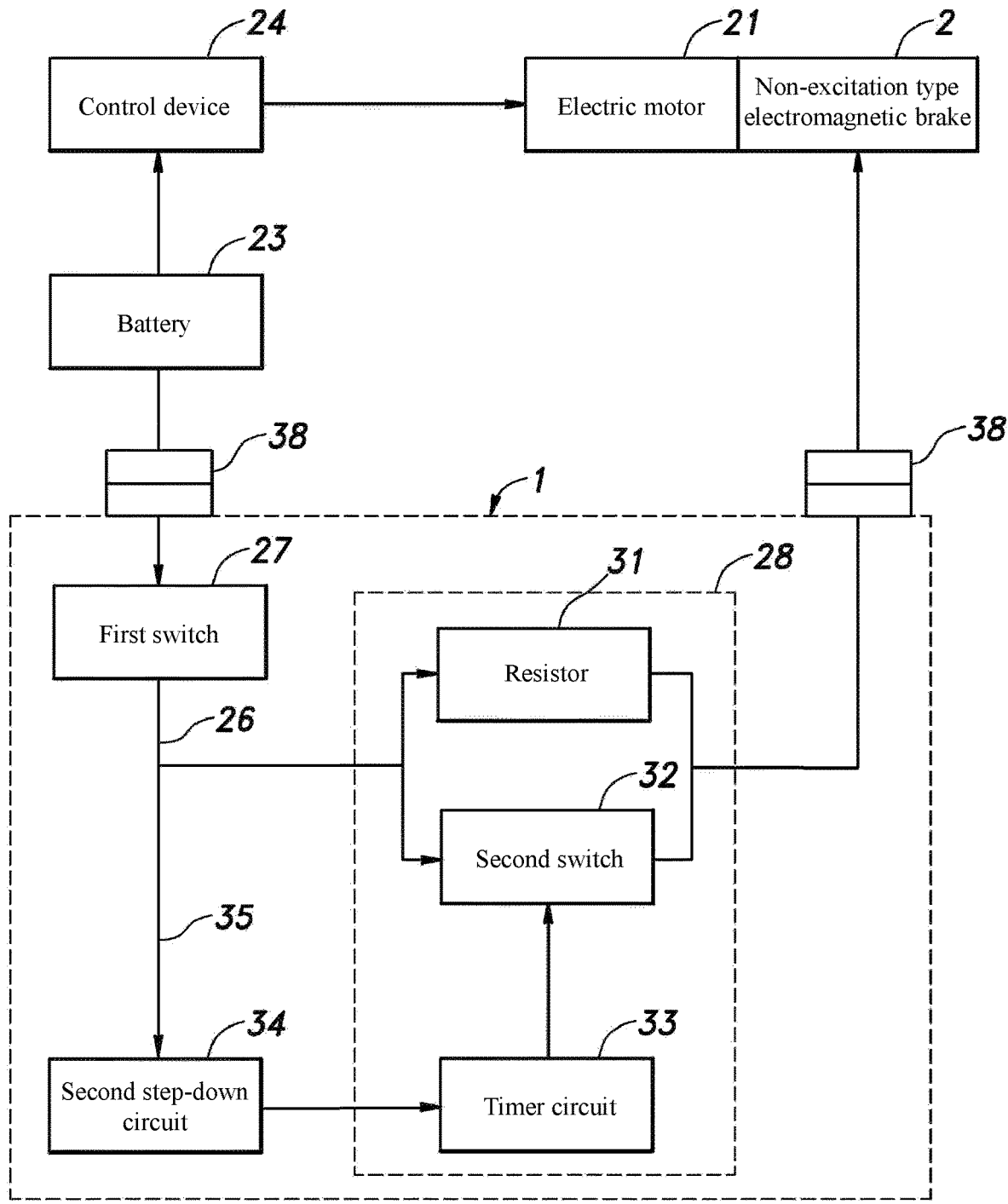
FIG. 4 is a configuration diagram of a release device according to a modified embodiment.

A specific embodiment has been described above, but the disclosure is not limited to the above embodiment and may be widely modified. For example, as shown in FIG. 4, the release device 1 may be detachably connected to the battery 23 and the non-excitation type electromagnetic brake 2. In this case, the release device 1 may be detachably connected to the battery 23 and the non-excitation type electromagnetic brake 2 via a connector 38.

What is claimed is:

1. A release device for non-excitation type electromagnetic brake that receives power supply from a battery via a brake control device to release a braking state, the release device for non-excitation type electromagnetic brake comprising:
   a bypass circuit path that connects the battery and the non-excitation type electromagnetic brake without intermediary of the brake control device;
   a first switch that turns on and off energization to the bypass circuit path; and
   a first step-down circuit provided on the bypass circuit path and that reduces a voltage supplied to the non-excitation type electromagnetic brake.

2. The release device for non-excitation type electromagnetic brake according to claim 1, wherein the first step-down circuit comprises: a resistor and a second switch connected in parallel; and a timer circuit that controls on and off of the second switch.

3. The release device for non-excitation type electromagnetic brake according to claim 2, wherein the timer circuit turns off the second switch after a predetermined time has elapsed since the first switch was turned on.

4. The release device for non-excitation type electromagnetic brake according to claim 3, wherein the bypass circuit path comprises a branch circuit path branched from the first step-down circuit side of the first switch, the release device for non-excitation type electromagnetic brake further comprises a second step-down circuit provided on the branch circuit path and that steps down a voltage of the battery and supplies the voltage to the timer circuit.

5. The release device for non-excitation type electromagnetic brake according to claim 4, wherein the bypass circuit path is detachably connected to the battery and the non-excitation type electromagnetic brake.

6. The release device for non-excitation type electromagnetic brake according to claim 3, wherein the bypass circuit path is detachably connected to the battery and the non-excitation type electromagnetic brake.

7. The release device for non-excitation type electromagnetic brake according to claim 2, wherein the bypass circuit path comprises a branch circuit path branched from the first step-down circuit side of the first switch, the release device for non-excitation type electromagnetic brake further comprises a second step-down circuit provided on the branch circuit path and that steps down a voltage of the battery and supplies the voltage to the timer circuit.

8. The release device for non-excitation type electromagnetic brake according to claim 7, wherein the bypass circuit path is detachably connected to the battery and the non-excitation type electromagnetic brake.

9. The release device for non-excitation type electromagnetic brake according to claim 2, wherein the bypass circuit path is detachably connected to the battery and the non-excitation type electromagnetic brake.

10. The release device for non-excitation type electromagnetic brake according to claim 1, wherein the bypass circuit path is detachably connected to the battery and the non-excitation type electromagnetic brake.

* * * * *